United States Patent [19]

Chiarito

[11] Patent Number: 5,024,771

[45] Date of Patent: Jun. 18, 1991

[54] LIQUID FILTER AND METHODS OF FILTRATION AND CLEANING OF FILTER

[75] Inventor: Richard J. Chiarito, Corona, Calif.

[73] Assignee: Everfilt Corporation, Corona, Calif.

[21] Appl. No.: 480,062

[22] Filed: Feb. 14, 1990

[51] Int. Cl.⁵ .............................................. B01D 24/46
[52] U.S. Cl. .................................... 210/791; 210/353; 210/409; 210/493.2; 210/497.01
[58] Field of Search ............... 210/350, 353, 407, 409, 210/485, 304, 493.2, 497.01, 497.1, 489, 791, 787

[56] References Cited

U.S. PATENT DOCUMENTS

3,481,474 12/1969 Paulson ..................... 210/497.1 X
3,487,931 1/1970 Paulson ....................... 210/304 X
3,754,658 8/1973 Messing ........................ 210/304

*Primary Examiner*—Charles Hart
*Attorney, Agent, or Firm*—Edward J. DaRin

[57] ABSTRACT

The disclosed filter element is a screen filter having a vane arranged on the outside surface of a screening element for improving the filtration of solid contaminants from a liquid undergoing filtration. A single cartridge screening element may be quickly cleansed within a minimum time interval with raw water and without requiring the removal of the filtering element.

10 Claims, 4 Drawing Sheets

Fig. 10.
FLUSH MODE

Fig. 9.
FILTRATION

Fig. 11.
FLUSH

Fig. 12.

LIQUID FILTER AND METHODS OF FILTRATION AND CLEANING OF FILTER

FIELD OF INVENTION

This invention relates to liquid filters for filtering out any solid contaminants entrained in a liquid and, more particularly, to screen filters and improved methods of filtration and cleaning the filter with the contaminants lodged on the screening for the filter.

BACKGROUND OF INVENTION

Screen filters are well-known in the art for filtering out solids from liquids such as water for irrigation purposes and similar applications requiring filtration. Screen filters cleanse the liquids having solid contaminants entrained therein by depositing the solids on the screening of the filter while conveying the cleansed water through the screen and out of the filter housing. The screen filters that are known in the art have many different configurations but are basically classified on the basis of the liquid flow through the filter, i.e., the flow of the liquid from the inside of the screening to the outside of the screening or the flow of the liquid to be filtered from the outside of the screening to the inside thereof. When a screen filter is constructed and defined to cause the liquids to flow from the inside out, raw water or contaminated liquids enter the interior of a screen housing, passes through the screening longitudinally of the housing, and the filtered water exits along the housing body at each of the apertures for the screening and out the discharge port of the filter housing. The support structure for the screened material is the inside of some type of cylinder or the cylinder itself is the screen. When the liquid filter is defined so that the contaminated water flows from the outside of the screening, then, the raw water or liquid enters the screening along the housing body longitudinally and passes through the apertures of the screening longitudinally along the outside of the screen cartridge. The filtered water exits along the interior of the screen cartridge and out of the filter housing. The support structure for the screen cartridge is the outside of some type of cylinder or the cylinder itself is the screen. It is also well-known to filter contaminated liquids such as water with the use of sand filters which trap the contaminants within the sand filtration media, rather than by the screening, in the same general fashion as the screen filters.

When a screen filter is resorted to, the contaminants or solids lodge in or are deposited on the screen cartridge, making it necessary to clean the screening from time to time to maintain the efficiency of the filtration. Various methods are presently known for cleaning the screen filters, including the method of physically removing the screen element from its housing and physically cleaning it by conventional flushing. A second method is known as the through flushing method in which the raw water is passed through the screen cartridge for removing the particulate material from the screening material. A further method is to backwash the filter by admitting filtered water at the outlet port and forcing it back through the screening toward the raw water or the inlet side of the filter. In this method the contaminants flow out the inlet port through appropriate valving. Accordingly, there is a present need for an improved screen filtration structure and methods of cleaning the filter and preferably for providing a rupture free screen for filtration and cleansing purposes that minimize the amount of liquid and time required for cleaning of the filters.

SUMMARY OF THE INVENTION

The present invention provides an improved and inexpensive screen filter and, more particularly, an improved screen filter cartridge that is a non-corroding cartridge, along with a non-corroding housing for the screen cartridge that is highly abrasive resistant and has a high differential cleaning capability on a reverse flow. The improved filter is of a light weight, inexpensive installation and uses system pressures, without requiring any minimums for use of the filter. The improved screen filter allows raw water to be used for flushing or cleansing a single screen cartridge to be cleaned, without removal from the housing, with raw or contaminated liquids in a minimum amount of time, on the order of two to five seconds and thereby reduces the amount of liquids required for cleaning the filter. This is an important advantage in the areas where irrigation is carried on and water is scarce. The improved filter also allows for the forced, reverse flow flushing, a technique whereby the contaminants or the solids are forced away from the screening towards the housing and out of the housing proper.

From a broad structural standpoint, the present invention comprehends the provision of a screen cartridge for use as a screen filter for screening solids from liquids wherein the cartridge comprises a filtering element constructed and defined of a preselected type of wire screening of a preselected configuration for ready insertion into a coacting filter housing for filtering solids from liquids conveyed to flow through the wire screening. The improved screen cartridge includes means constructed and defined on the outside surface thereof for generating a high velocity directional flow to a liquid conveyed over the surface of the screening during a flushing operation for removing accumulated solids from the wire screening in a minimum amount of time. The means for generating the high velocity turbulence may simply comprise vane means spirally wound on the outside surface of the screen means to dislodge the solids trapped thereon.

From the standpoint of the structure of the liquid filter, the present invention comprises a cylindrical housing of a preselected length having liquid inlet means arranged adjacent an end of the housing and liquid outlet means spaced from the inlet means so that the contaminated water traversing between the inlet and outlet means is filtered and cylindrical screening means mounted in the housing in a preselected spaced relationship with the interior wall of the housing for filtering the liquid conveyed into the inlet means and exiting from the outlet means with any solids entrained in the liquid admitted into the inlet means being deposited on the screening means. The screening means includes means constructed and defined on the outside surface thereof for generating a high velocity turbulence of the liquid conveyed over the surface of the screening means between the inlet and outlet means.

A method of filtration by means of the improved screen filter and cleaning the screen filter, without removing the screen filter from the filter housing, as comprehended by the present invention includes the steps of providing a filter housing for a screen filter to be accommodated therein with the liquid to be filtered being conveyed into the housing between the screen filter and the inner wall of the housing and the liquid to be filtered being conveyed through the screen filter. The housing is provided with an inlet port for receiving a liquid to be filtered, a discharge port for the filtered liquid to exit the filter housing and a flush port for discharging contaminants in the liquid undergoing filtering that have been separated from the liquid during the filtration period. The method includes mounting a screen filter in the housing inn a spaced relationship with the housing wall for conveying a liquid to be filtered between the inner housing wall and the screen filter. The screen filter and the filter housing are constructed and defined relative to one another for increasing the velocity of the liquid to be filtered admitted into the housing at the inlet port and conveyed over the screen filter to the discharge port, thereby causing the heavier contaminants to be forced towards the housing wall and the lighter contaminants to be conveyed along the outer surface of the screen filters. The filtration method includes maintaining the flush port of the housing open during the filtering operation, admitting a liquid having solid contaminants entrained therein into the housing at the inlet port to be conveyed between the housing wall and the adjacent surface of the screen filter; the liquid having a preselected high velocity at the inlet port, thereby causing the liquid to be filtered to be conveyed through the screen filter and into the interior of the screen filter and out of the housing at the discharge port. The solid contaminants tending to lodge in the screen surface are dislodged, while the smaller solid contaminants will be conveyed along the screen surface as a result of the increased velocity imparted to the liquid undergoing filtering, thereby flushing the conveyed solid contaminants through the flush port during the filtering operations.

An alternate method includes the step of arranging an isolation control valve at the outlet port for controlling the flow of the filtered liquid therefrom and arranging a control valve at the flush port for controlling the flow of the contaminants through the flush port, closing the isolation control valve and the flush port control valve for equalizing the pressure on both sides of the screen filter and then opening the flush port control valve for immediately creating a low pressure condition on the outside surface of the screen filter, whereby the high pressure on the opposite side of the screen filter will cause the solid contaminants to move away from the screen filter, including the contaminants lodged in the screen filter, while imparting a directional flow thereto towards the flush port; admitting the liquid of a preselected velocity into the housing at the inlet port to be conveyed between the housing wall and the adjacent surface of the screen filter, causing the liquid to flow through the screen filter and thereby filtering out the solid contaminants that are conveyed out of the flush port during the intervals the isolation control valve is closed and the flush port control valve is open to thereby cleanse the screening.

Yet another alternative method of flushing the screen filter is to periodically open the flush port during the filtration procedure to clean the solid contaminants from the surface of the screen filter.

BRIEF DESCRIPTION OF THE DRAWINGS

These and other features of the present invention may be more fully appreciated when considered in light of the following specification and drawings, in which.

DETAILED DESCRIPTION OF THE PREFERRED EMBODIMENTS

Figure 1:
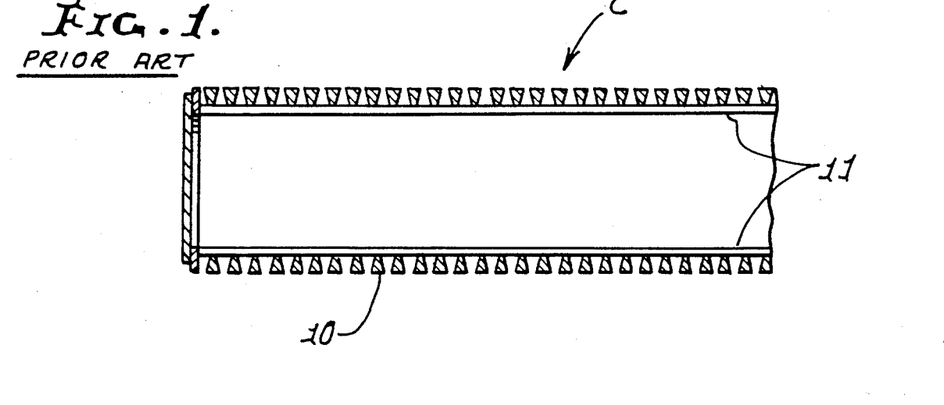
FIG. 1 is a partial, cross-sectional view of a prior art, profile wire, screen filter cartridge of the type useful in the present invention.

Now referring to FIG. 1, a prior art screen cartridge will be described as it is the preferred cartridge to be modified for use in the present invention. Prior art filtering devices and screen filters of the type under consideration are presently commercially available from the Everfilt Corporation of Corona, California. The preferred prior art screen cartridge modified for the present invention is an all welded, single unit made of stainless steel profile wire although other types of screen filters are useful for the purposes of the present invention. The cartridge is identified in FIG. 1 by the reference letter C. The cartridge is defined by means of a preselected length of profile wire 10 having a triangular cross-sectional configuration with preselected sized apertures A between the successive windings for the wire. The profile wire 10 illustrated in FIG. 1 is wound around a plurality of supporting rods 11 arranged longitudinally of and coextensive with the cartridge C. The smooth surface of the profile wire 10 is arranged on the outside of the cartridge C with the pointed ends of the profile wire being secured to the plurality of longitudinally extending support rods 11 arranged in a preselected spaced circular relationship for forming a cylindrical cartridge, as is known in the art. Only two such support rods are illustrated in FIG. 1; however, a multiplicity of support rods are generally required for defining a complete tubular or cylindrical construction with the profile wire 10 being welded to the multiplicity of support rods 11 for providing the necessary collapse and burst strength to the cartridge C. The collapse strength may be on the order of 125 pounds per square inch, with a burst strength of 400 pounds per square inch. This feature for the Everfilt cartridge eliminates common screen blowouts or collapse, rupture or tearing of the woven or perforated screen material of competitive screen filters and gives maximum protection to the filtering system employing the cartridge C. As is known in the art, the screen filter C may be used with the liquid flowing from the inside out or the outside in of the cartridge and can be cleaned either manually or automatically. The use of such a cartridge C also has the advantage that the filtration and backwashing operations are accomplished over the entire surface of the screen material and, therefore, there are no blind spots or partial cleaning of the cartridge C. The slot openings or the apertures between the successive convolutions of the profile wire are fixed and welded in position unlike woven material screening that can flex and move. These prior art cartridges C are known for use in cylindrical housings, constructed of an epoxy coated carbon steel or a stainless steel, permitting insertion of a cartridge C in a spaced relationship with the interior wall of the housing.

Figure 2:
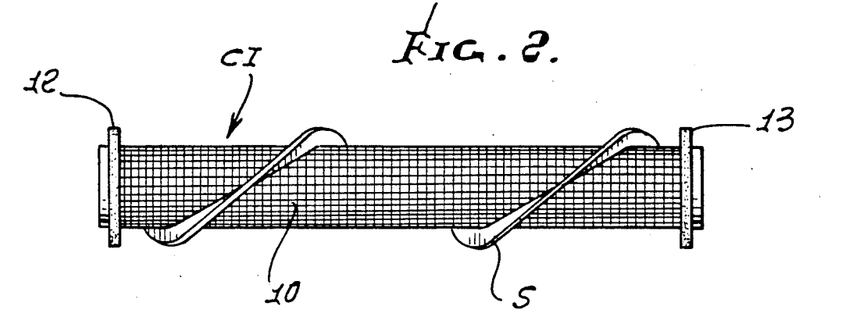
FIG. 2 is a front elevational view of the improved screen cartridge embodying the present invention.
Figure 3:
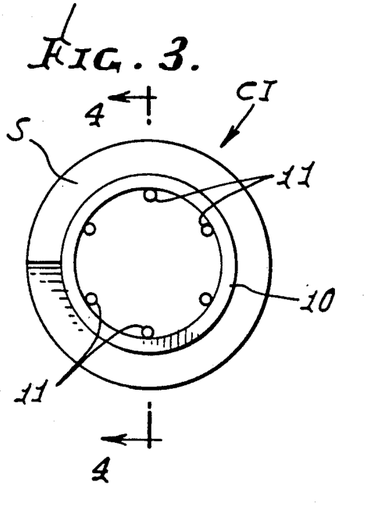
FIG. 3 is an end view of the filtering cartridge of FIG. 2.
Figure 4:
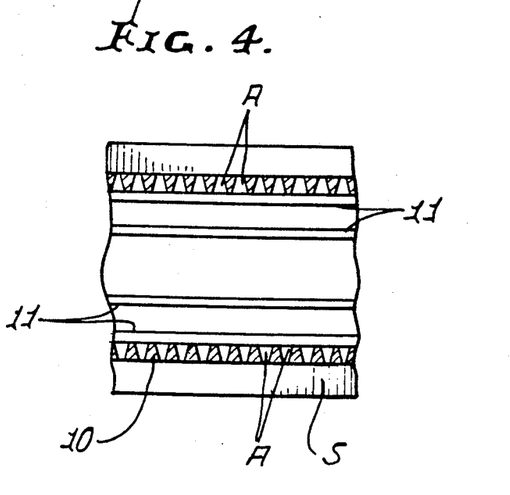
FIG. 4 is a partial, cross-sectional view, taken along the line 4—4 of FIG. 3.

Now referring to FIG. 2, an improved cartridge CI constructed in accordance with the present invention will be examined and described. The cartridge CI is basically of the same construction as the cartridge C of the prior art but has a spiral scroll or vane S spirally wound on the outside or the smooth surface of the cartridge C from one end to another for imparting the desired high velocity turbulence to a liquid impinging thereon and conveyed over the surface from one end to the other end for aiding in the cleansing action of the filter screen. The cartridge CI of FIG. 2 is also illustrated with rubber seals 12 and 13 arranged at opposite ends thereof for sealing engagement with the inner wall of the filter housing H for the cartridge CI. The cartridge is preferably defined of a stainless steel profile wire 10. The apertures A between the successive spirals of the profile wire 10 are best illustrated in FIG. 4 wherein the openings between the successive spirals of the profile wire 10 may be arranged with openings between 50, 75, 100, 150 or 200 mesh equivalent slot openings The slot openings A are fixed due to the welding of the wire 10 to the support rods 11; unlike the woven materials of the prior art they maintain their relative position within the filter housing.

Figure 5:
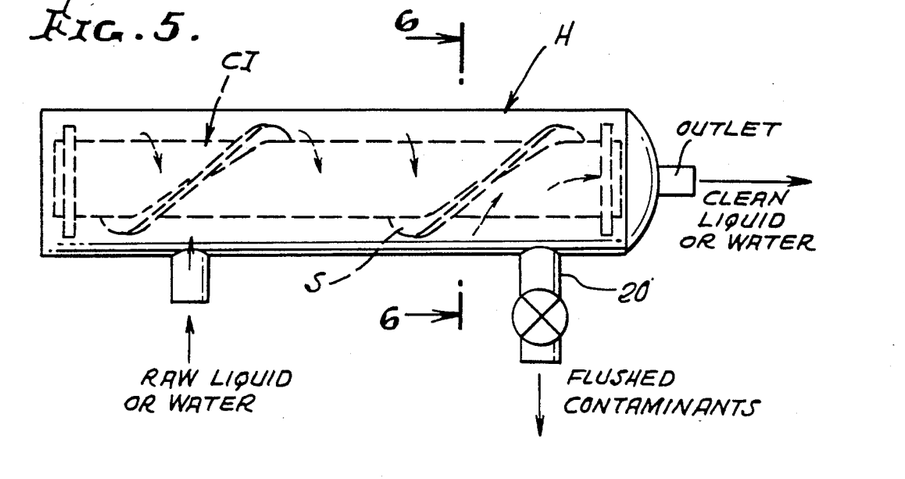
FIG. 5 is a diagrammatic illustration of the filter housing having the filtering element of FIG. 2 therein illustrated in dotted outline, and embodying the present invention.

Now referring to FIG. 5 wherein the diagrammatic representation of the filter H having the cartridge CI mounted therein and illustrated in dotted outline, it will be described. The filter H is provided with an inlet port for receiving raw liquid or raw water therein for filtration by the cartridge element CI. The housing H also has an axially arranged outlet port at one end through which the clean liquid or water is discharged from the interior of the cartridge CI. A bypass flush port 20 is also provided intermediate the ends of the filter housing H. In a filtration operation utilizing the filter of FIG. 5, the contaminated or raw water is admitted into the inlet port for the filter housing H at a certain velocity X and is conveyed across the screen surface of the cartridge CI at a lower velocity. The raw liquid is filtered as a result of the liquid penetrating through the apertures A of the cartridge into the interior of the cartridge CI. The contaminants that may be entrained in the raw liquid that are larger than the apertures selected for the apertures A are trapped on the aperture surface. If the velocity of the liquid traveling across the cartridge smooth outside surface is increased, it will dislodge the exposed contaminants from the apertures A and cause them to be flushed through the bypass flush port and any valving associated therewith when the flush port valving is in the open condition, as illustrated in FIG. 5.

Figure 6:
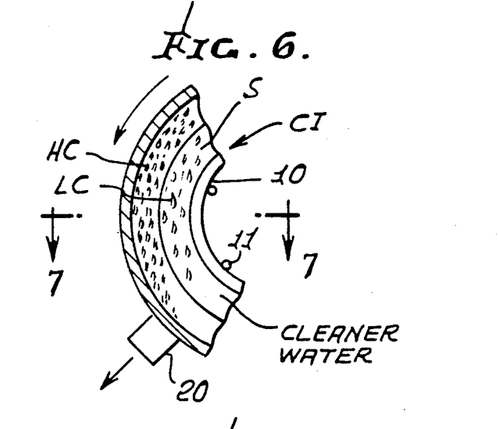
FIG. 6 is a partial, sectional view taken along the line 6—6 of FIG. 5 for illustrating a method of bypass flushing of the filtering cartridge.
Figure 7:
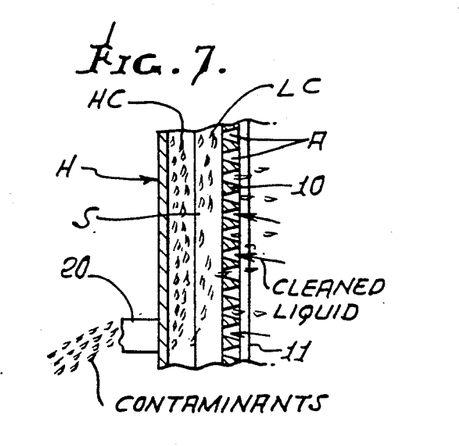
FIG. 7 is a partial cross-sectional view taken along the line 7—7 of FIG. 6.
Figure 8:
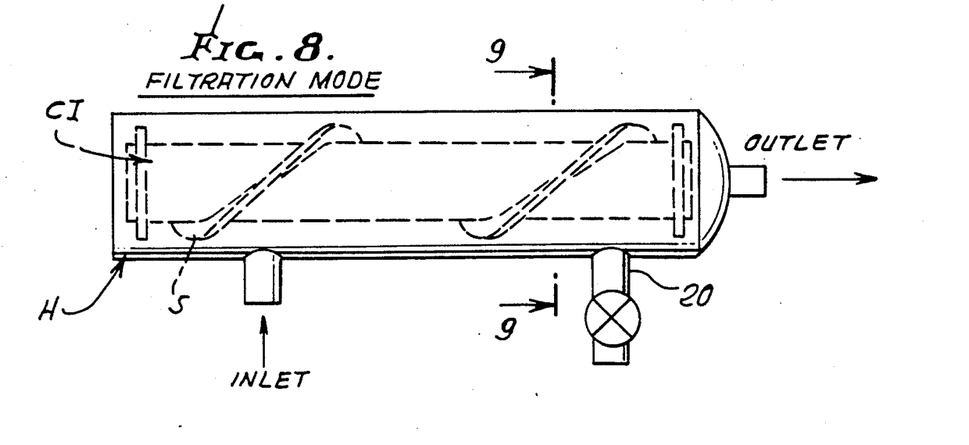
FIG. 8 is a diagrammatic illustration of the filter element of the present invention as illustrated in FIG. 5 and illustrating a filtration mode therefor.

The improved filter element of the present invention utilizing the cartridge CI may be operated in two filtration modes. The first filtration mode may be appreciated by reference to FIGS. 5 through 7 which permit filtration and a continuous flushing by means of the bypass flush port. For this purpose the control valve diagrammatically illustrated with the bypass flush port 20 in FIG. 5 is arranged and maintained in an open condition. The raw liquid or water of a high velocity is admitted into the inlet port at a preselected high velocity so as to immediately impinge against the scroll or vane S and is directed by the scroll S into a spiral path from the inlet port to the outlet port along the outside smooth outer surface of the cartridge element CI. The spiral vane S induces a centrifugal force on the heavier contaminants entrained in the raw liquid forcing them away from the cartridge CI and against the inner wall of the housing H. The heavy contaminants are illustrated in FIG. 6 as the contaminants HC. The high velocity of the admitted liquid also keeps the smaller, finer contaminants LC moving along the outer smooth surface of the cartridge CI. Both the heavy contaminants HC and the lighter contaminants LC are discharged through the open bypass flush port 20 and through the open control valve therefor. The cleaner, filtered water or liquid penetrates through the apertures A of the cartridge CI and exits the outlet port of the housing H.

Figure 9:
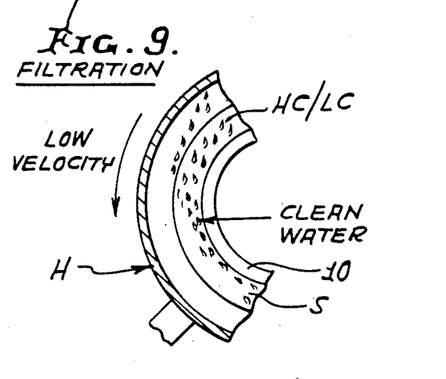
FIG. 9 is a partial, sectional view taken along the line 9—9 of FIG. 8 for illustrating a filtration mode of operation.
Figure 10:
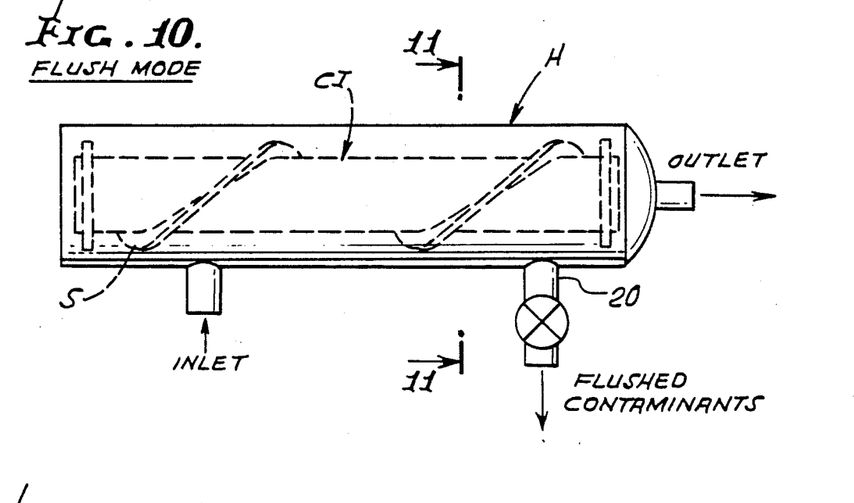
FIG. 10 is a diagrammatic illustration of the filtering element of FIG. 8 and illustrating a flush mode of operation.
Figure 11:
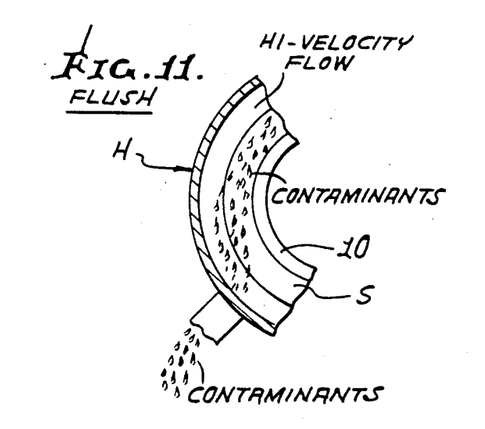
FIG. 11 is a partial, cross-sectional view taken along the line 11—11 of FIG. 10.
Figure 12:
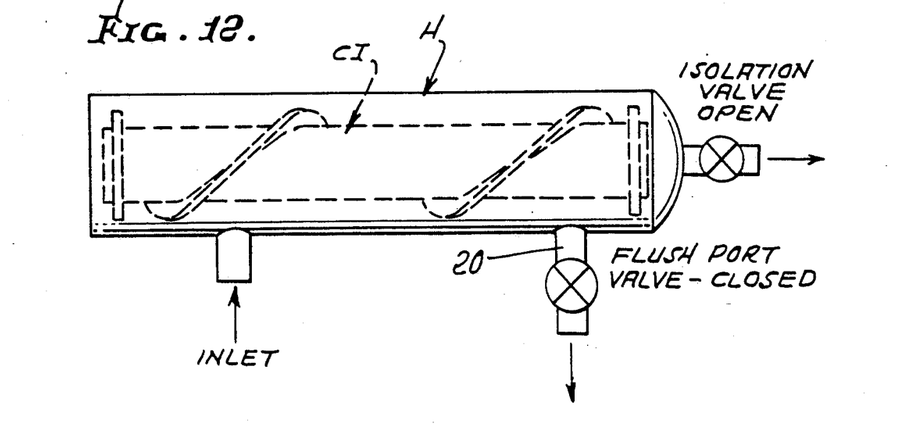
FIG. 12 is a diagrammatic illustration of a modified filter element illustrated in a filtration mode.
Figure 13:
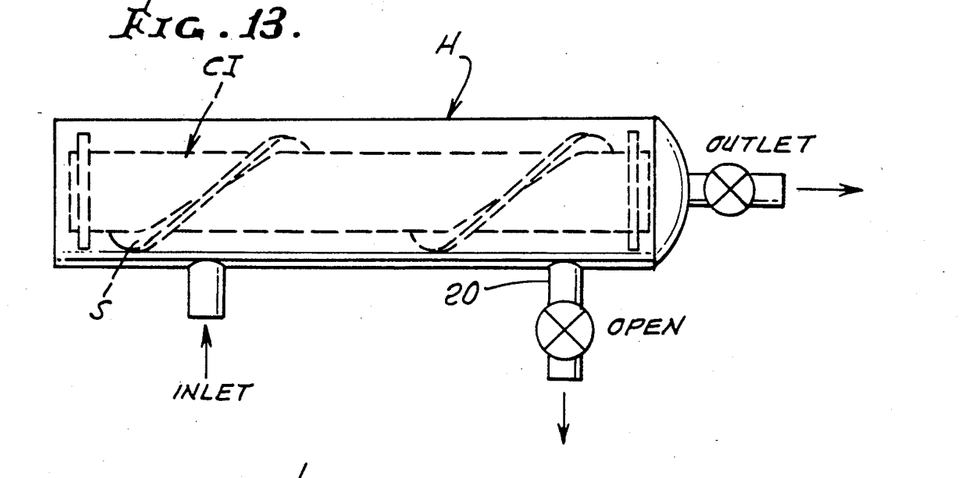
FIG. 13 is a diagrammatic illustration of the filter element of FIG. 12 but with the isolation valve at the outlet port arranged in the closed position and the flush port valve open for a bypass flushing operation.

The previous filtration method is considered to be a high velocity, high differential pressure continuous bypass flush, while a second method to be described hereinafter is considered a low velocity, low differential pressure periodic flush. A high velocity is considered to be 1 foot per second or more and a low velocity below 1 foot per second for the purposes of the present invention. In this latter technique a low velocity, contaminated liquid or water is admitted into the inlet port of the housing H and is distributed over the outer surface of the cartridge CI; see FIG. 9. The flush valve is normally closed. The vane S gives a moderate directional spiral flow to the low velocity raw liquid admitted into the housing H. The clean water penetrates through the apertures A and the contaminants that were entrained in the raw liquid admitted into the input port are trapped on the surface of the apertures A. The velocity across the surface of the cartridge CI decreases as the contaminants continue to build up in the apertures A. When the flush valve for the flush port 20 is operated to an open condition, the vane S directs a directional, increased velocity to the liquid conveyed across the smooth outer surface of the cartridge CI, thereby removing the contaminants from the apertures A and are discharged as illustrated in FIG. 11. This may be done periodically for cleaning the contaminants from the cartridge CI during the filtration process by manually or automatically controlling the operation of the control valve for the flush or contaminate discharge port. This flushing technique flushes approximately 25 percent of the contaminants in periods of 2 to 5 seconds.

Figure 14:
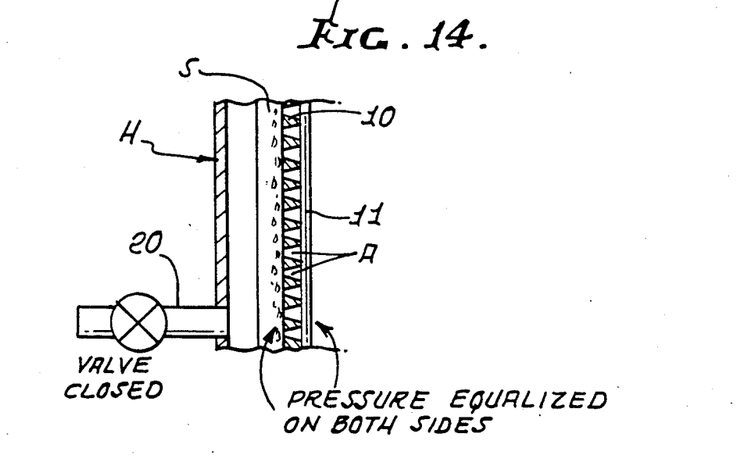
FIG. 14 is a partial, sectional view of a force flushing operation wherein the isolation valve and the flush port valve are both closed for equalizing the pressure on both sides of the filtering element for a flushing operation.
Figure 15:
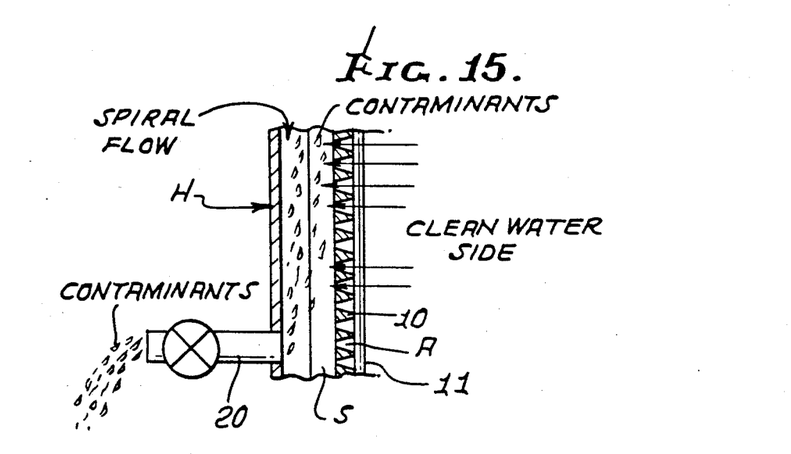
FIG. 15 is a diagrammatic view of the flushing operation of FIG. 14 when the flush port valve is open and illustrating the liquid forcing the contaminants away from the screen filter and through the flush port.

With the above filtration methods in mind, methods of force flushing useful with either of the filtration methods described hereinabove will now be examined. The force flushing is effected by adding an isolation valve associated with the outlet port of the housing H utilized in the previous embodiments. The flush port 20 is again provided with a flush port valve. When the isolation valve and the flush port valve are both closed, the cartridge CI is pressurized equally on both sides of the openings A of the cartridge, as illustrated in FIG. 14. When the flush valve is opened, it creates an instantaneous low pressure on the outside surface of the cartridge CI. The higher pressure on the inside of the cartridge CI will force the contaminants away from the apertures A and at the time that the flush valve for the flush port is opened. At the same time a higher velocity is created and the scroll S creates a spiral, directional flow over the smooth outer face of the cartridge CI. The spiral directional flow imparted to the liquid will carry the loosened contaminants out the flush port 20 and the flush port open valve, as illustrated in FIG. 15.

It should now be appreciated by those skilled in the art that improved screen filtration methods and cleaning methods are disclosed to the art by the present specification.

I claim:

1. A liquid filter comprising a cylindrical housing of a preselected length having liquid inlet means arranged adjacent an end of the housing and liquid outlet means spaced from the inlet means so that a liquid having solid contaminants entrained therein traversing between the inlet and outlet means is filtered, and cylindrical screening means mounted in the housing in a preselected spaced relationship with the interior wall of the housing for filtering the liquid conveyed into the inlet means and exiting from the outlet means with any contaminants entrained in the liquid admitted into the inlet means being deposited on the screening means, said screening means including means constructed and defined on the outside surface thereof for generating a high velocity turbulence of a liquid impinging on said means and for conveying the high velocity liquid by said means over the surface of the screening means between the inlet means and the outlet means for aiding in cleaning the solids deposited on the screening means the screening means to the outlet means.

2. A liquid filter as defined in claim 1 wherein the means for generating a high velocity turbulence to the liquid to be filtered comprises vane means spirally wound on the outside surface of the screening means.

3. A liquid filter as defined in claim 2 wherein the vane means is oriented on the screening means relative to the inlet means and outlet means for causing a liquid impinging thereon to traverse a spiral path as it is conveyed over the screening means to the outlet means.

4. A liquid filter as defined in claim 1 or 2 including sealing means secured to each end of said screening means.

5. A cartridge for use as a screen filter for filtering solids from liquids comprising a filtering element constructed and defined of a preselected type of wire screening of a preselected configuration for ready insertion in a filter housing for filtering solids from liquids conveyed to flow through the wire screening, and means constructed and defined on the outside surface of the filtering element for causing a high velocity turbulence to imparted to a liquid impinging thereon and conveyed over the surface of the screen during a flushing operation for removing accumulated solids from the wire screening.

6. A cartridge as defined in claim 5 wherein the wire screening comprises a high strength profile wire screen filter constructed of a welded single unit with the smooth side of the profile wire arranged on the outside surface thereof.

7. A liquid filter as defined in claim 1 or 2 wherein said means for generating a high velocity turbulence comprises vane means spirally wound on the outside surface of the profile wire screen filter from end to end and oriented to receive the liquid to be filtered and impart a relative high velocity to the liquid as it is conveyed over the filter for dislodging the solids trapped on said smooth side of the profile wire screen.

8. A method of filtration of solid contaminants from a liquid by means of a screen filter and cleaning the screen, without removing the screen filter from the filter housing, including the steps of providing a filter housing for a screen filter to be accommodated therein with the liquid having contaminants to be filtered being conveyed in the housing between the screen filter and the inner wall of the housing and the filtered liquid being conveyed through the screen filter, the housing having an inlet port for receiving a liquid to be filtered, a discharge port for the filtered liquid to exit the filter housing and a flush port for discharging contaminants in the liquid undergoing filtering separated from the liquid during filtering, mounting a screen filter in the filter housing in a spaced relationship with the housing for conveying a liquid to be filtered, the screen filter and the filter housing being constructed and designed relative to one another for imparting an increased velocity to the liquid to be filtered admitted into the housing at the inlet port and conveyed over the screen filter to the discharge port thereby causing the high velocity of the liquid rushing over the surface of the screen filter whereby the heavier contaminants are forced towards the housing wall and the lighter contaminants are conveyed along the outer surface of the screen filter, maintaining the flush port of the housing open during the filtering operation, admitting a liquid having solid contaminants entrained therein into the housing at the inlet port to be conveyed between the housing wall and the adjacent surface of the screen filter, the liquid having a preselected high velocity at the inlet port thereby causing the liquid to be filtered to be conveyed between the housing wall and the adjacent surface of the screen filter and out of the housing at the discharge port, the solid contaminants tending to lodge in the screen surface are dislodged by the increased velocity of the liquid while the smaller solid contaminants will be conveyed along the screen surface as a result of the increased velocity imparted to the liquid undergoing filtering thereby flushing the conveyed solid contaminants through the flush port during the filtering operations.

9. A method of filtration of solid contaminants from a liquid by means of a screen filter and cleaning the screen, without removing the screen filter from the filter housing, including the steps of providing a filter housing for a screen filter to be accommodated therein with the liquid to be filtered being conveyed into the housing between the screen filter and the inner wall of the housing and the filtered liquid being conveyed through the screen filter, the housing having an inlet port for receiving a liquid to be filtered, a discharge port for the filtered liquid to exit the filter housing and a flush port for discharging contaminants in the liquid undergoing filtering separated from the liquid during filtering, mounting a screen filter in the filter housing in a spaced relationship with the housing for conveying a liquid to be filtered, the screen filter and the filter housing being constructed and designed relative to one another for increasing the velocity to the liquid to be filtered admitted into the housing at the inlet port and conveyed over the surface of the screen filter to the discharge port thereby causing the heavier contaminants to be forced towards the housing wall and the lighter contaminants to be conveyed along the outer surface of the screen filter, arranging an isolation control valve at the outlet port for controlling the flow of the filtered liquid therefrom, arranging a control valve at the flush port for controlling the flow of the contaminants through the flush port, closing the isolation control valve and the flush port control valve for equalizing the pressure on both sides of the screen filter and then opening the flush port control valve for creating a low pressure condition on the outside surface of the screen filter whereby the higher pressure on the opposite side of the screen filter will cause the solid contaminants to move away from the screen filter including the contaminants lodged in the screen filter while a higher velocity imparted with a directional flow towards the flush port to the liquid admitted into the inlet port, and admitting a liquid of a preselected velocity into the housing at the inlet port to be conveyed between the housing wall and the adjacent surface of the screen filter causing the liquid to flow through the screen filter and thereby filtering out the solid contaminants that are conveyed out of the flush port during the interval the isolation control valve is closed and the flush port control valve is open.

10. A method of filtration of solid contaminants from a liquid by means of a screen filter and cleaning the screen, without removing the screen filter from the filter housing, including the steps of providing a filter housing for a screen filter to be accommodated therein with the liquid to be filtered being conveyed into the housing between the screen filter and the inner wall of the housing and the filtered liquid being conveyed through the screen filter, the housing having an inlet port for receiving a liquid to be filtered, a discharge port for the filtered liquid to exit the filter housing and a flush port for discharging contaminants in the liquid undergoing filtering separated from the liquid during filtering, mounting a screen filter in the filter housing in a spaced relationship with the housing for conveying a liquid to be filtered, the screen filter and the filter housing being constructed and designed relative to one another for increasing the velocity of the liquid to be filtered admitted into the housing at the inlet port and conveyed over the screen filter to the discharge port thereby causing the heavier contaminants to be forced towards the housing wall and the lighter contaminants to be conveyed along the outer surface of the screen filter, maintaining the flush port of the housing closed during the filtering operation, admitting a liquid having solid contaminants entrained therein into the housing at the inlet port to be conveyed between the housing wall and the adjacent surface of the screen filter, the liquid having a preselected low velocity at the inlet port thereby causing the liquid to be filtered to be conveyed through the screen filter and into the interior of the screen filter and out of the housing at the discharge port, and the solid contaminants build up on the outer surface of the screen filter, and periodically opening the flush port to clean the solid contaminants from the surface of the screen filter, the solid contaminants lodged on the screen surface are dislodged and will be conveyed along the screen surface as a result of the increased velocity imparted to the liquid undergoing filtering, thereby flushing the conveyed sold contaminants through the flush port during the filtering operations.

* * * * *

UNITED STATES PATENT AND TRADEMARK OFFICE
CERTIFICATE OF CORRECTION

PATENT NO. : 5,024,771
DATED : June 18, 1991
INVENTOR(S) : Richard J. Chiarito

It is certified that error appears in the above-identified patent and that said Letters Patent is hereby corrected as shown below:

Column 3, line 10, "inn" should read -- in --.
Column 4, line 17, after "partial" insert a comma (,).
Column 7, line 49, delete "the screening".
Column 7, line 50, delete "means to the outlet means." and insert -- during filtration. -- therefor
Column 8, line 51, delete "between the"
Column 8, line 52, delete "housing wall and the adjacent surface" and insert -- through the screen filter and into the interior --
Column 9, line 10, first occurrence delete "to" and substitute -- of --.

Signed and Sealed this

Twenty-ninth Day of December, 1992

Attest:

DOUGLAS B. COMER

Attesting Officer

Acting Commissioner of Patents and Trademarks